United States Patent
Hirai (10) Patent No.: US 12,401,899 B2
(45) Date of Patent: Aug. 26, 2025

(54) CONTROL APPARATUS, LENS APPARATUS, IMAGE PICKUP APPARATUS, CAMERA SYSTEM, CONTROL METHOD, AND STORAGE MEDIUM

(71) Applicant: CANON KABUSHIKI KAISHA, Tokyo (JP)

(72) Inventor: Daisuke Hirai, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 214 days.

(21) Appl. No.: 18/464,344

(22) Filed: Sep. 11, 2023

(65) Prior Publication Data

US 2024/0089599 A1    Mar. 14, 2024

(30) Foreign Application Priority Data

Sep. 13, 2022 (JP) ................. 2022-145477

(51) Int. Cl.
*H04N 23/68* (2023.01)
*G03B 5/00* (2021.01)

(52) U.S. Cl.
CPC .......... *H04N 23/683* (2023.01); *G03B 5/00* (2013.01); *H04N 23/6812* (2023.01); *H04N 23/687* (2023.01); *G03B 2205/0007* (2013.01)

(58) Field of Classification Search
CPC .... H04N 23/68; H04N 23/682; H04N 23/685; H04N 23/687; G03B 2205/0023; G03B 2205/0038
USPC ...................................... 348/208.5
See application file for complete search history.

(56) References Cited

U.S. PATENT DOCUMENTS

| | | | |
|---|---|---|---|
| 2014/0111661 A1 | 4/2014 | Watanabe et al. | |
| 2016/0330378 A1* | 11/2016 | Tsuchiya | H04N 23/6812 |
| 2019/0158748 A1* | 5/2019 | Maruhashi | H04N 23/651 |
| 2019/0289216 A1* | 9/2019 | Ito | H04N 23/687 |

FOREIGN PATENT DOCUMENTS

| | | | | |
|---|---|---|---|---|
| JP | 6103877 B2 | 3/2017 | | |
| JP | 6410431 B2 | 10/2018 | | |
| JP | 2018173632 A | 11/2018 | | |
| JP | 2021162633 A * | 10/2021 | ........... | G02B 27/646 |

* cited by examiner

*Primary Examiner* — Anthony J Daniels
(74) *Attorney, Agent, or Firm* — ROSSI, KIMMS & McDOWELL LLP

(57) ABSTRACT

A control apparatus for use in a camera system that includes a first correction member provided on one of an image pickup apparatus and a lens apparatus detachable from the image pickup apparatus, and a second correction member provided on the other of the image pickup apparatus and the lens apparatus includes a memory storing instructions, and a processor configured to execute the instructions to control image stabilization using first control configured to provide image stabilization based on a first correction ratio between image stabilization using the first correction member and image stabilization using the second correction member and to electronically correct a trapezoidal distortion in an image blur, or second control configured to provide image stabilization based on a second correction ratio between image stabilization using the first correction member and image stabilization using the second correction member without electronically correcting the trapezoidal distortion in an image blur.

12 Claims, 6 Drawing Sheets

(1) TRANSLATION (2) ROTATION (3) TILT

CONTROL APPARATUS, LENS APPARATUS, IMAGE PICKUP APPARATUS, CAMERA SYSTEM, CONTROL METHOD, AND STORAGE MEDIUM

BACKGROUND

Technical Field

One of the aspects of the embodiments relates to a control apparatus, a lens apparatus, an image pickup apparatus, a camera system, a control method, and a storage medium.

Description of Related Art

Camera systems have conventionally been proposed that perform image stabilization using both image stabilization (OIS) that moves an image stabilizing lens provided in an interchangeable lens and image stabilization (IIS) that moves an image sensor provided in a camera (body). Japanese Patent No. 6410431 discloses a configuration for setting an image stabilizing ratio between OIS and IIS so as to effectively utilize image stabilizing ranges of both OIS and IIS.

Depending on the optical system in the interchangeable lens that adopts the central projection method, an image point moving amount that occurs on an object image during camera shake may differ between a central portion and a peripheral portion of the image. In particular, as the optical system becomes a wide angle, the image point moving amount in the peripheral portion becomes larger than that in the central portion. Therefore, after the image stabilization is performed, the peripheral portion may remain blurred more than the central portion. Japanese Patent Laid-Open No. 2018-173632 discloses a configuration for setting an image stabilizing ratio in consideration of a difference between an image blur amount in the central portion and an image blur amount at an arbitrary image point position, which is generated by the central projection method.

Japanese Patent No. 6103877 discloses a tilt correction configuration, which is one of the so-called electronic image stabilizations, for canceling, through image transformation, image blur, in which the image is distorted into a trapezoidal shape due to vibration applied to the image pickup apparatus.

In the configurations of Japanese Patent No. 6410431 and Japanese Patent Laid-Open No. 2018-173632, the image stabilizing degree in a peripheral portion of an image is different depending on a difference in the setting of an image stabilizing ratio. In a case where tilt correction is additionally performed, proper tilt correction may not be able to be performed unless the operation is changed in accordance with the method of setting the image stabilizing ratio.

SUMMARY

A control apparatus according to one aspect of the embodiment for use in a camera system that includes a first correction member provided on one of an image pickup apparatus and a lens apparatus attachable to and detachable from the image pickup apparatus, and a second correction member provided on the other of the image pickup apparatus and the lens apparatus includes a memory storing instructions, and a processor configured to execute the instructions to control image stabilization using first control configured to provide image stabilization based on a first correction ratio between image stabilization using the first correction member and image stabilization using the second correction member and to electronically correct a trapezoidal distortion in an image blur, or second control configured to provide image stabilization based on a second correction ratio between image stabilization using the first correction member and image stabilization using the second correction member without electronically correcting the trapezoidal distortion in an image blur. A lens apparatus, an image pickup apparatus, and a camera system each having the above control apparatus also constitute another aspect of the embodiment. A control method corresponding to the above control apparatus also constitutes another aspect of the embodiment.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

Figure 1:
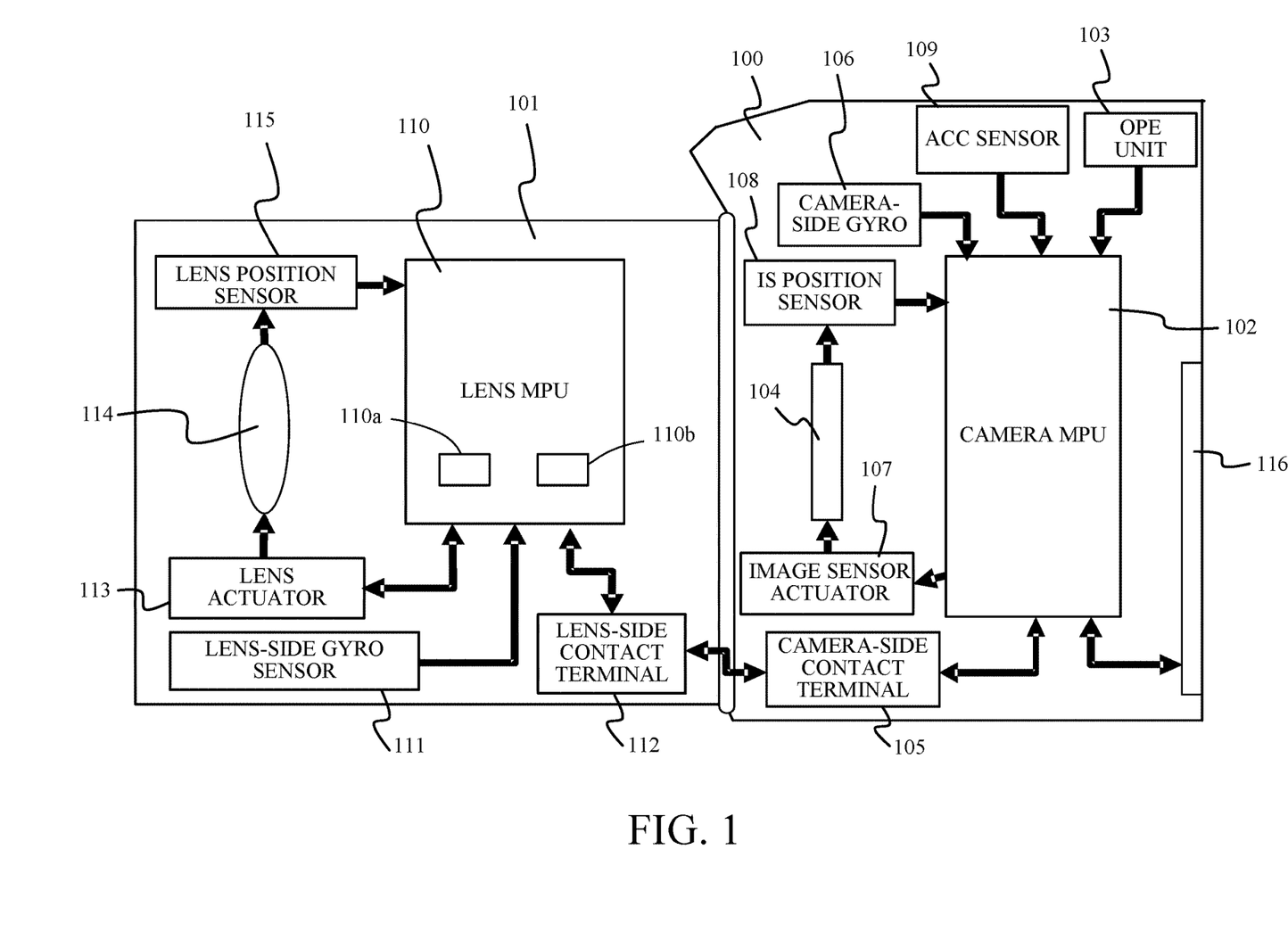
FIG. 1 is a block diagram of a camera system according to one embodiment.

FIG. 1 is a block diagram of a camera system according to one embodiment. The camera system includes a camera body (image pickup apparatus) 100 and an interchangeable lens 101 detachably and communicatively attached to the camera body 100.

The camera body 100 includes a camera MPU 102, an operation unit 103, an image sensor 104, a camera-side contact terminal 105, a camera-side gyro sensor 106, an image sensor actuator 107, an image sensor position sensor (IS position sensor) 108, an acceleration sensor 109, and a rear display 116.

The camera MPU 102 is a controller that governs overall control of the camera system, and controls various operations such as auto-exposure (AE), autofocus (AF), and imaging according to input from the operation unit 103. The camera MPU 102 communicates various commands and information with the lens MPU 110 provided in the interchangeable lens 101 through the camera-side contact terminal 105 and a lens-side contact terminal 112 provided to the interchangeable lens 101. The camera-side contact terminal 105 and the lens-side contact terminal 112 include power terminals for supplying power from the camera body 100 to the interchangeable lens 101.

The operation unit 103 includes a mode dial for setting various imaging modes, a release button for instructing an imaging preparation operation and imaging start, and the like. In a case where the release button is half-pressed, a first switch (SW1) is turned on, and in a case where the release button is fully pressed, a second switch (SW2) is turned on. In a case where SW1 is turned on, AE and AF are performed as an imaging preparation operation, and in a case where SW2 is turned on, the AE setting is finalized, the AF is stopped, and the like, and an instruction to start imaging (exposure) is issued (SW2-1 is turned on). A predetermined time after the instruction, actual exposure is started (SW2-2 is turned on). SW2-1 and SW2-2 are turned off when the set exposure time has passed and the imaging is finished. The turning on and off of SW1, SW2-1, and SW2-2 are notified from the camera MPU 102 to the lens MPU 110 through communication.

The image sensor 104 includes a photoelectric conversion element such as a CCD sensor or a CMOS sensor, and photoelectrically converts an object image formed by an imaging optical system, which will be described below, to generate an imaging signal. The camera MPU 102 generates a video (or image) signal using the imaging signal from the image sensor 104.

The camera-side gyro sensor 106 detects angular shake (camera shake) applied to the camera body 100 due to camera shake or the like, and outputs a camera shake detection signal as an angular velocity signal. The camera MPU 102 drives the image sensor actuator 107 based on the camera shake detection signal and the image stabilizing ratio for ITS, which will be described below, and thereby moves the image sensor 104 in a direction including a component of a direction orthogonal to the optical axis of the imaging optical system. Thereby, image blur caused by camera shake can be reduced (corrected). At this time, the camera MPU 102 performs feedback control of the image sensor actuator 107 so that the position of the image sensor 104 detected by the image sensor position sensor 108 (a moving amount from the position on the optical axis, which is a moving center) approaches the target position. Due to the above configuration, image stabilization (referred to as IIS hereinafter) that moves the image sensor 104 is performed. The camera MPU 102 performs IIS and so-called electronic image stabilization, which electronically transforms an image using a signal from the camera-side gyro sensor 106, and provides translational transformation (deformation), rotational transformation, and trapezoidal transformation (tilt correction).

The acceleration sensor 109 detects the orientation of the camera body 100 and shake (shift shake) that is difficult to detect with the camera-side gyro sensor 106.

The rear display 116 displays an image corresponding to the image signal generated by the camera MPU 102 using the imaging signal from the image sensor 104. Prior to imaging, the user can observe a displayed image as a finder image (live-view image). After imaging, a still image or moving image for recording generated by imaging can be displayed on the rear display 116. "imaging" in this embodiment means imaging for recording.

The interchangeable lens 101 includes the imaging optical system including an image stabilizing lens 114, a lens MPU 110, a lens-side gyro sensor 111, the lens-side contact terminal 112, a lens actuator 113, and a lens position sensor 115.

The lens-side gyro sensor 111 detects angular shake (lens shake) applied to the interchangeable lens 101 and outputs a lens shake detection signal as an angular velocity signal. The lens MPU 110 drives the lens actuator 113 based on the lens shake detection signal and an image stabilizing ratio for OIS, which will be described below, so that the image stabilizing lens 114 is moved in a direction including a component in a direction orthogonal to the optical axis of the imaging optical system. Thereby, image blur caused by lens shake can be reduced (corrected). At this time, the lens MPU 110 performs feedback control of the lens actuator 113 so that the position of the image stabilizing lens 114 detected by the lens position sensor 115 (moving amount from the position on the optical axis, which is a moving center) approaches the target position. Due to the above configuration, image stabilization (hereinafter referred to as OIS) that moves the image stabilizing lens 114 is performed.

The lens MPU 110 includes a correction unit (first correction unit) 110a and a control unit 110b in this embodiment. The correction unit 110a performs image stabilization with the image sensor 104 using at least one of the image sensor 104 and the image stabilizing lens 114 based on a first image stabilizing ratio (first correction ratio) between OIS and IIS or a second image stabilizing ratio (second correction ratio) between OIS and ITS. The first image stabilizing ratio is determined based on a movable amount of the image sensor 104 and a movable amount of the image stabilizing lens 114. The second image stabilizing ratio is determined based on information on an image moving amount between a central portion and a peripheral portion of an image in a case where OIS is performed and information on an image moving amount between a central portion and a peripheral portion in a case where IIS is performed. The control unit 110b executes the first control or the second control. The first control performs image stabilization based on the first image stabilizing ratio by the correction unit 110a, and an image transformation processing unit (second correction unit) 217 performs image stabilization, in particular, corrects blur that is distorted in a trapezoidal shape, trapezoidal distortion. The second control performs image stabilization based on the second image stabilizing ratio by the correction unit 110a without correcting trapezoidal distortion by the image transformation processing unit 217.

Figure 2:
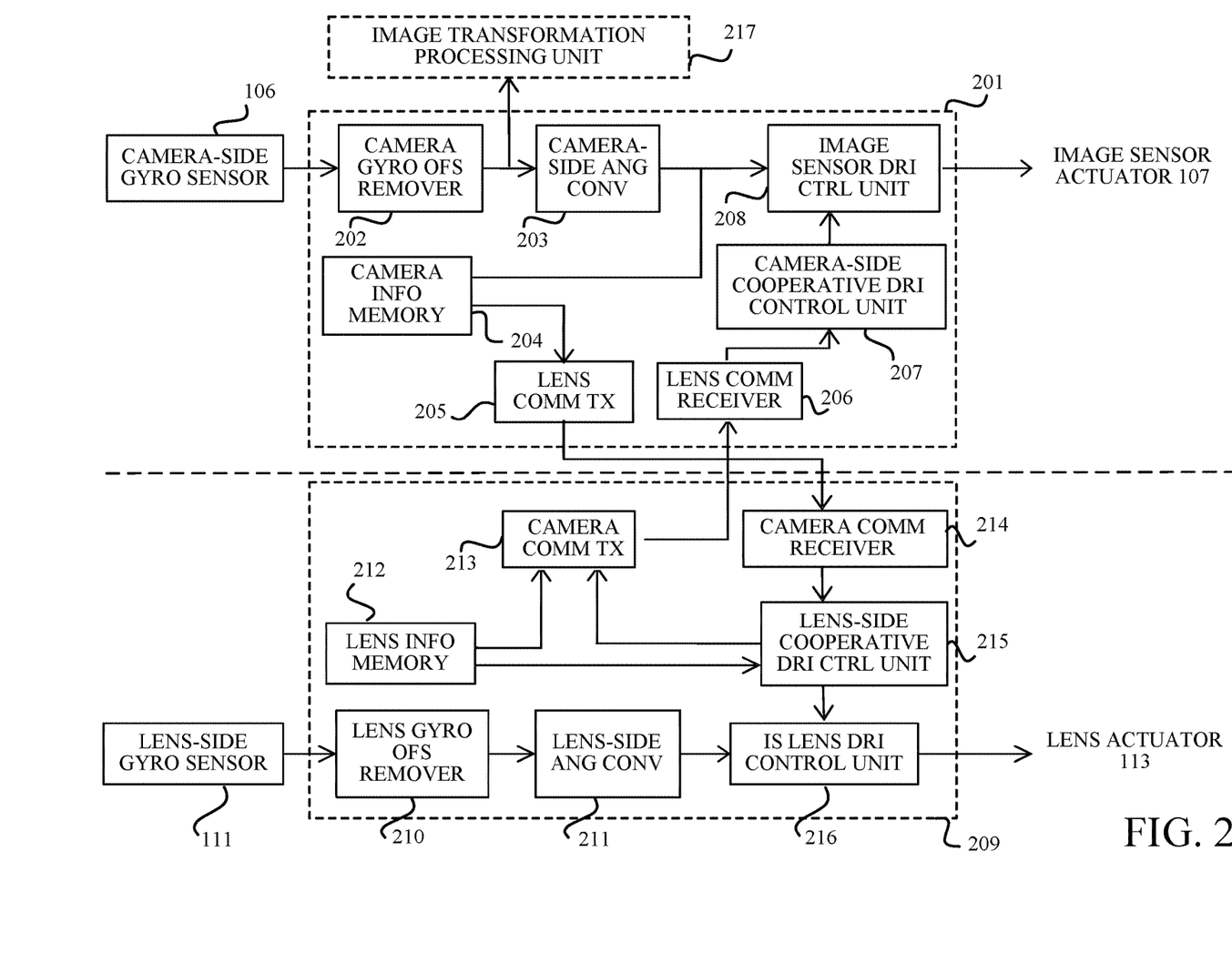
FIG. 2 is a block diagram of an image stabilizing unit.

Referring now to FIG. 2, a description will be given of the configuration of the image stabilizing unit in the camera system. FIG. 2 is a block diagram of the image stabilizing unit. The image stabilizing unit includes an image stabilizing unit 201 that is part of the camera MPU 102 and an image stabilizing unit 209 that is part of the lens MPU 110.

The image stabilizing unit 201 includes a camera gyro offset remover 202, a camera-side angle converter 203, a camera information memory 204, a lens communication transmitter 205, a lens communication receiver 206, a camera-side cooperative driving control unit 207, and an image sensor driving control unit 208. The camera gyro offset remover 202 removes an offset component from the angular velocity signal detected by the camera-side gyro sensor 106. The camera-side angle converter 203 converts the angular velocity signal output from the camera gyro offset remover 202 into an angle signal. The camera information memory 204 stores information such as a stroke (movable amount) of the image sensor 104, which is an IIS correction member, and a sensor size. A lens communication transmitter 205 transmits information stored in the camera information memory 204 to the camera communication receiver 214 in the image stabilizing unit 209. The lens communication receiver 206 receives information transmitted from the camera communication transmitter 213 in the image stabilizing unit 209. The camera-side cooperative driving control unit 207 determines an image blur amount to be corrected by IIS based on the information stored in the camera information memory 204 and the information received by the lens communication receiver 206. The image sensor driving control unit 208 generates a driving control signal for the image sensor 104 using the angle signal output from the camera-side angle converter 203 and the image blur amount output from the camera-side cooperative driving control unit 207. The output from the camera gyro offset remover 202 is sent to an image transformation processing unit 217 which is a separate processing block in the camera MPU 102, and the image transformation processing unit 217 executes image transformation processing for an image using the output from the camera gyro offset remover 202.

The image stabilizing unit 209 includes a lens gyro offset remover 210, a lens-side angle converter 211, a lens information memory 212, a camera communication transmitter 213, a camera communication receiver 214, a lens-side cooperative driving control unit 215, and an image stabilizing lens driving control unit 216. The lens gyro offset remover 210 removes an offset component from the angular velocity signal detected by the lens-side gyro sensor 111. The lens-side angle converter 211 converts the angular velocity signal output from the lens gyro offset remover 210 into an angle signal. The camera communication transmitter 213 transmits information stored in the lens information memory 212 to the lens communication receiver 206 in the image stabilizing unit 201. The camera communication receiver 214 receives information transmitted from the lens communication transmitter 205 in the image stabilizing unit 201.

The lens information memory 212 stores information about an image stabilizing ratio and a stroke of the image stabilizing lens 114, which is an OIS correction member. The lens information memory 212 also stores information about an image stabilization angle in a case where the image sensor 104 moves by a predetermined amount, that is, the camera image stabilization sensitivity.

The lens information memory 212 stores lens peripheral image blur residue amount information, which is an image stabilization residue (remaining) amount in a peripheral portion of an image in a case where the image stabilizing lens 114 performs image stabilization in a central portion of an image by a predetermined angle. The lens peripheral image blur residue amount may be information about an image point moving amount at a central portion of an image and an image point moving amount at a predetermined image height in a case where the image stabilizing lens 114 is moved by a predetermined amount, or may be obtained from information about an image stabilization angle in a case where the image stabilizing lens 114 is moved by a predetermined amount. The lens peripheral image blur residue amount may be a function that indicates how the image stabilization residue amount in a peripheral portion of an image changes for each image height in a case where image stabilization is performed for the central portion of the image by a predetermined angle.

The lens information memory 212 stores a camera peripheral image blur residue amount, which is an image stabilization residue amount in a peripheral portion of an image in a case where the image sensor 104 performs image stabilization for the central portion of the image by a predetermined angle. The camera peripheral image blur residue amount may be obtained from information about the image point moving amount in the central portion of the image and the image point moving amount at a predetermined image height in a case where the camera body 100 is rotated by a predetermined amount. The camera peripheral image blur residue amount may be a function that indicates how the image stabilization residue amount in the peripheral portion of the image changes for each image height in a case where image stabilization is performed for the central portion of the image by a predetermined angle.

The information stored in the lens information memory 212 may be information that is switched by moving the zoom lens or focus lens included in the imaging optical system.

The lens-side cooperative driving control unit 215 performs cooperative driving control of OIS and IIS using the information stored in the lens information memory 212 and the information received by the camera communication receiver 214. At this time, the lens-side cooperative driving control unit 215 sets an image stabilizing ratio for determining an image blur amount to be corrected by each image stabilizing unit. The lens-side cooperative driving control unit 215 determines whether to switch the image stabilizing ratio and lens internal information about sensitivity necessary for IIS using the information stored in the lens information memory 212 and the information received by the camera communication receiver 214. The image stabilizing lens driving control unit 216 generates a driving control signal for the image stabilizing lens 114 using the angle signal output from the lens-side angle converter 211.

Figure 3:
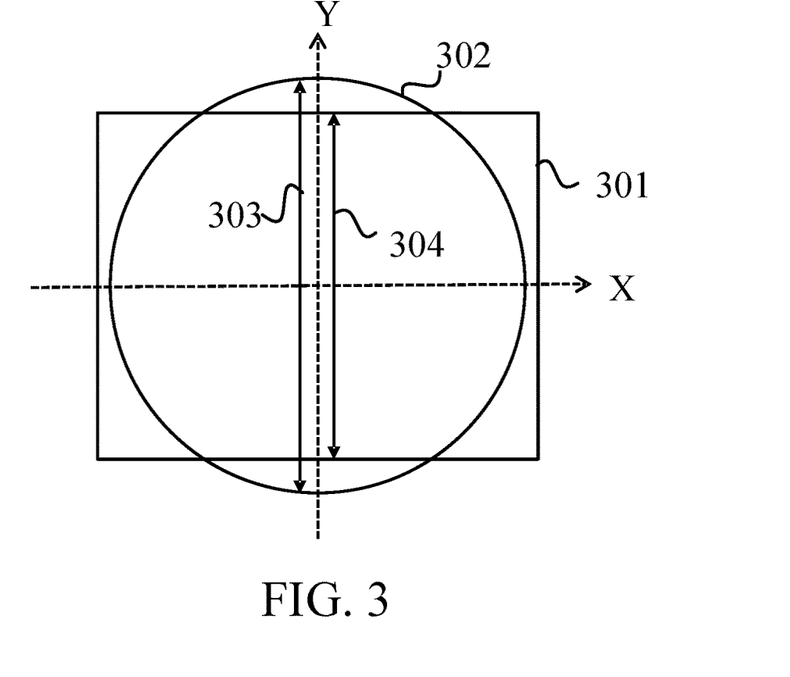
FIG. 3 illustrates a method of setting a first image stabilizing ratio.

Referring now to FIG. 3, a description will be given of a method of setting the first image stabilizing ratio of OIS and IIS. The image stabilizing ratio can be set from a plurality of methods depending on its purpose. FIG. 3 illustrates a method of setting the first image stabilizing ratio using a stroke ratio of OIS and IIS correction members. A range 301 is a mechanically movable range of the image sensor 104, which is the IIS correction member. A range 302 is an image circle of the interchangeable lens 101 and a movable range of the image stabilizing lens 114, which is the OIS correction member. A range 303 is a stroke in the Y-axis direction (OIS stroke) of the image stabilizing lens 114. The image sensor 104 is to move within the ranges 301 and 302. A range 304 is a stroke in the Y-axis direction (IIS stroke) of the image sensor 104. In image stabilization for the entire camera system using two correction members, setting the first image stabilizing ratio illustrated below can effectively utilize each stroke of the OIS and IIS correction members.

Image stabilizing ratio for OIS: OIS stroke/(IIS stroke+OIS stroke)

Image stabilizing ratio for IIS: IIS stroke/(IIS stroke+OIS stroke)

A description will now be given of a method of setting the second image stabilizing ratio for suppressing an image blur residue amount in a peripheral portion of an image. Since distortion remains in a general optical system, a difference in an image point moving amount occurs between a central portion and a peripheral portion of an image due to changes in a distortion amount in a case where IIS is performed. Also in OIS, eccentric distortion occurs due to the eccentricity of the lens, and the fluctuation of the eccentric distortion causes a difference in the image point moving amount between the central portion and the peripheral portion of the image. Therefore, in IIS, the influence of the projection method and the influence of distortion cause a difference in the image point moving amount between the central portion and the peripheral portion of the image, and in OIS, the influence of the projection method and the influence of eccentric distortion cause a difference in the image point moving amount between the central portion and the peripheral portion of the image. In other words, since the cause of the difference in the image point moving amount between the central portion and the peripheral portion of the image is different between OIS and IIS, the ratio of the image point moving amount between the central portion and the peripheral portion of the image is different between OIS and IIS.

Figure 4:
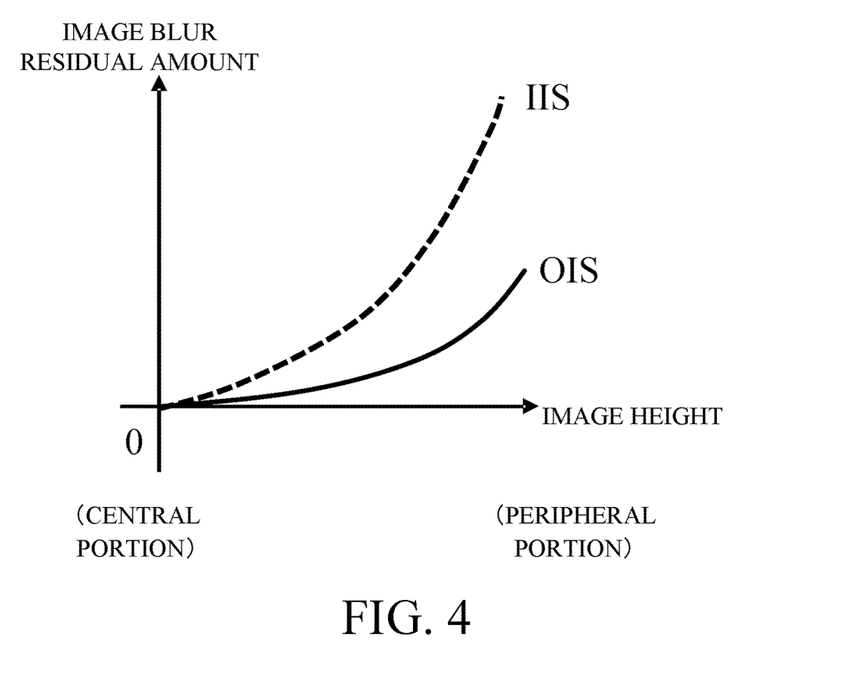
FIG. 4 illustrates an image blur residual amount for each image height in a case where a predetermined blur amount is corrected by OIS and IIS and an image blur residual amount in a central portion of an image is set to 0.

FIG. 4 illustrates an image blur residual amount for each image height in a case where a predetermined image stabilizing amount is performed by OIS and IIS and an image blur residual amount in the central portion of the image is set to 0. As illustrated in FIG. 4, in a case where a ratio of an image point moving amount is different between a central portion and a peripheral portion of an image, image stabilization may be performed by using one of the correction members preferentially so as to reduce an image blur residual amount.

Figure 5:
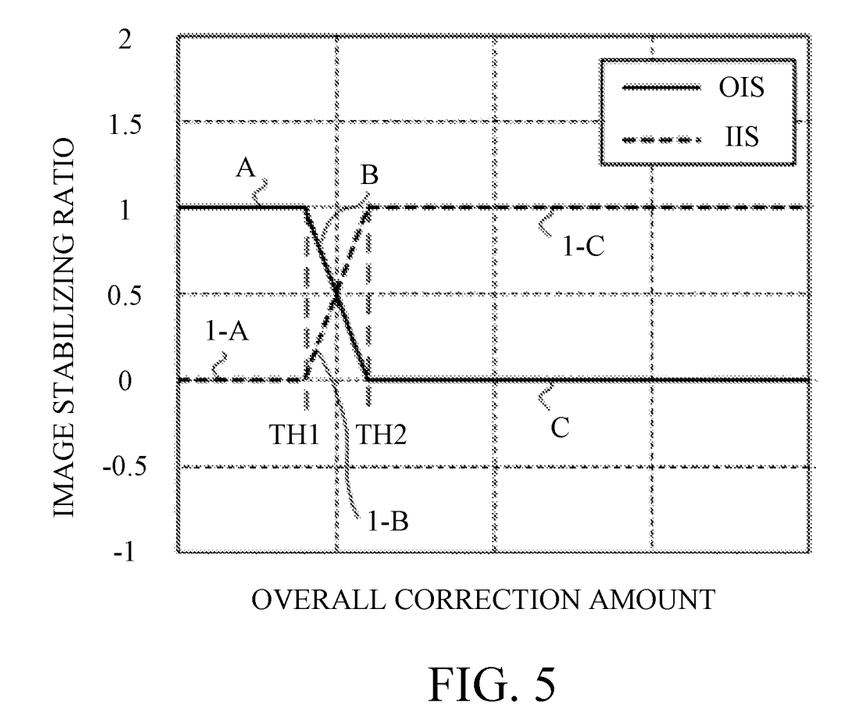
FIG. 5 illustrates a method of setting a second image stabilizing ratio.

Accordingly, as illustrated in FIG. 5, a method of setting the second image stabilizing ratio is conceivable in a case where the entire camera system has an image stabilization amount "a." In a case where the absolute value of the image stabilization amount "a" is smaller than a predetermined threshold TH1, the image stabilizing ratio for OIS is set to A (=1), and the image stabilizing ratio for IIS is set to 1−A (=0). In a case where the absolute value of the image stabilization amount a is equal to or larger than the predetermined threshold TH1 and smaller than a predetermined threshold TH2, the image stabilizing ratio for OIS is set to B, the image stabilizing ratio for IIS is set to 1−B, and the image stabilizing ratios of OIS and IIS are gradually adjusted. In a case where the absolute value of the image stabilization amount "a" is equal to or larger than the predetermined threshold TH2, the image stabilizing ratio for OIS is set to C (=0) and the image stabilizing ratio for IIS is set to 1−C (=1). Thus, the image stabilizing ratios can be set so as to reduce the image blur residue amount in the peripheral portion in the image by preferentially using a smaller image point moving amount of the peripheral portion to the central portion of the image more effectively than the method of setting the image stabilizing ratios based on the stroke ratio. However, the method illustrated in FIG. 5 may cause image blur residual amounts in the peripheral portion of the image to be different among regions corresponding to the image stabilizing ratios A, B, and C and increase the calculation load more than the method of setting the image stabilizing ratios based on the stroke ratio.

Figure 6:
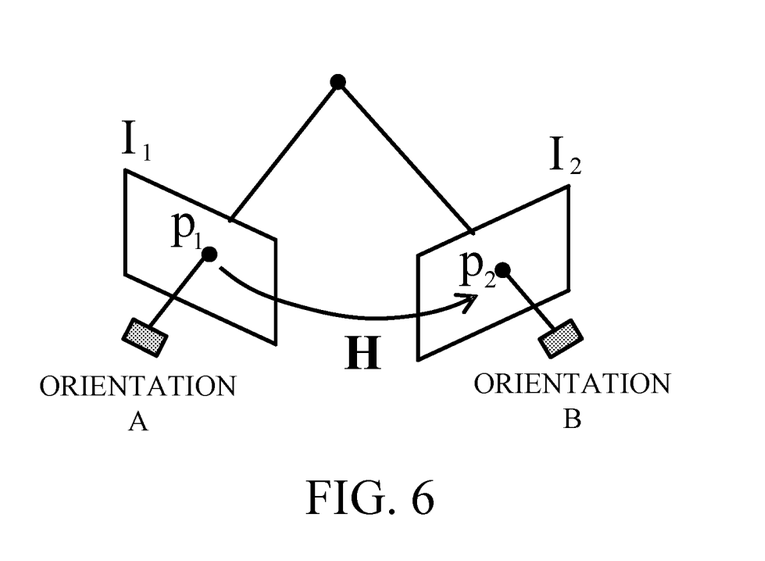
FIG. 6 explains projection transformation.
Figure 7:
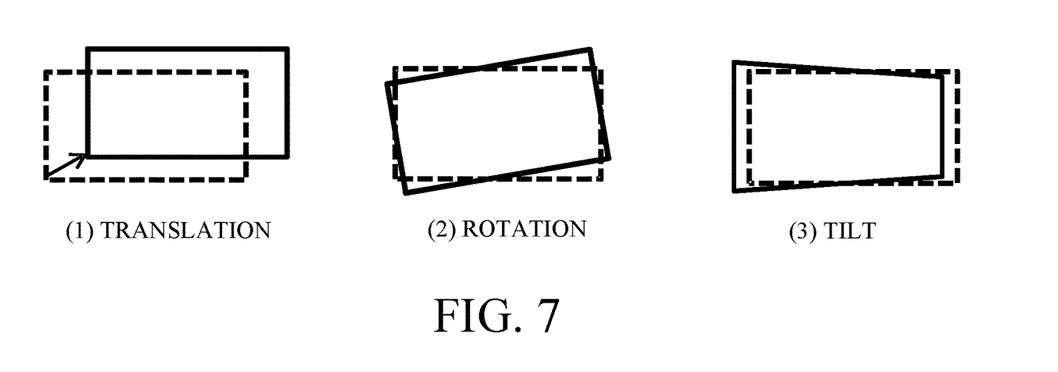
FIG. 7 illustrates types of electronic image stabilization.

Electronic image stabilization will now be described. Electronic image stabilization is generally performed by transforming an image using geometric transformation such as projective transformation. For example, as illustrated in FIG. 6, in a case where orientation A for capturing a certain object changes to orientation B, point $P_1$ on image $I_1$ in orientation A is converted into point $P_2$ on image $I_2$ in orientation B using determinant H. As illustrated in FIG. 7, the types of projection transformation include translation, rotation, tilt, and the like, and each transformation can be made by setting each parameter of the determinant. Here, the translational and rotational correction amounts can be calculated from the output of the camera-side gyro sensor 106 and the focal length information of the interchangeable lens 101. The tilt correction amount can be calculated from the translational amount and the focal length information. In order to simplify the calculation, equations are often constructed on the premise that each projection transformation correction amount changes in proportion to the image blur applied to the camera system. Therefore, in a case where the second image stabilizing ratio is set to suppress the image blur residue amount in the peripheral portion of the image, the image blur residual amount in the peripheral portion nonlinearly changes according to the image blur amount applied to the camera system. If the electronic image stabilization is performed in such a state, tilt correction, in particular, may not correctly correct trapezoidal distortion.

Figure 8:
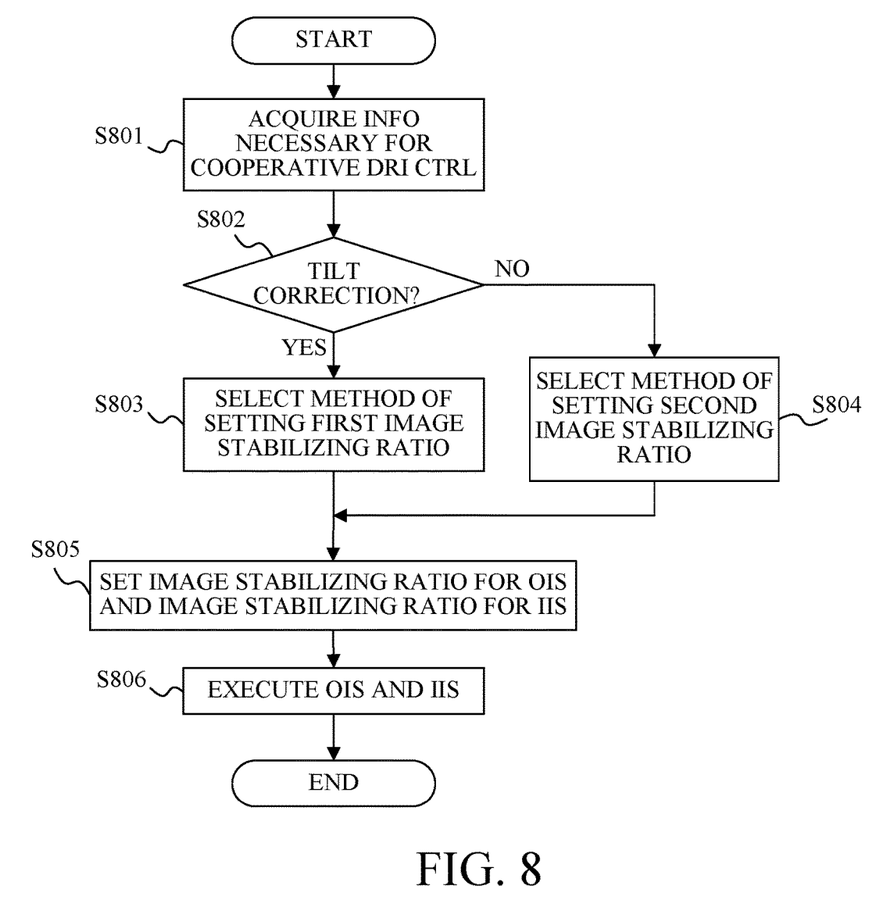
FIG. 8 is a flowchart illustrating cooperative driving control of OIS and IIS in a first embodiment.

Referring now to FIG. 8, a description will be given of cooperative driving control of OIS and IIS according to this embodiment. This embodiment assumes that the lens MPU 110 executes the cooperative driving control. FIG. 8 is a flowchart illustrating cooperative driving control of OIS and IIS according to this embodiment. After the camera system is powered on and the initial driving operation and the like are performed, this flow is started.

In step S801, the lens MPU 110 acquires information necessary for the cooperative driving control. The information necessary for the cooperative driving control includes the strokes of the OIS and IIS correction members, a camera peripheral image blur residue amount, a lens peripheral image blur residue amount, information on the sensitivity required for image stabilization, information on whether to perform electronic image stabilization by the image transformation processing unit 217, and the like.

In step S802, the lens MPU 110 determines whether or not tilt correction is to be performed in the electronic image stabilization. In a case where it is determined to perform tilt correction, the process of step S803 is executed, and in a case where it is determined not to perform tilt correction, the process of step S804 is executed.

In step S803, the lens MPU 110 selects the method of setting the first image stabilizing ratio based on the stroke ratio.

In step S804, the lens MPU 110 selects the method for setting the second image stabilizing ratio for suppressing the image blur residue amount in the peripheral portion of the image.

In step S805, the lens MPU 110 sets the image stabilizing ratio for OIS and the image stabilizing ratio for IIS based on the selected image stabilizing ratio setting method.

In step S806, the lens MPU 110 executes OIS and IIS using the image stabilizing ratio set in step S805.

In performing tilt correction, the configuration of this embodiment selects a method of setting the first image stabilizing ratio based on the stroke ratio. That is, the lens MPU 110 causes the image transformation processing unit 217 to perform tilt correction, and executes cooperative driving control of OIS and IIS at the first image stabilizing ratios set by the setting method selected in step S803. Thereby, image stabilization can be performed so as to properly utilize the OIS and IIS strokes, and the image blur residue amount in the peripheral portion of the image can be corrected using the tilt correction. On the other hand, in a case where tilt correction is not performed, the method of setting the second image stabilizing ratio is selected so as to reduce the image blur residual amount in the peripheral portion of the image. That is, the lens MPU 110 prevents the image transformation processing unit 217 from performing tilt correction, and executes the cooperative driving control of OIS and IIS at the second image stabilizing ratios set by the setting method selected in step S804. Thereby, the image blur residual amount in the peripheral portion of the image can be reduced.

The cooperative driving control is performed by the lens MPU 110 in this embodiment, but may be performed by the camera MPU 102. In this case, the camera MPU 102 includes a correction unit and a control unit.

Second Embodiment

A basic configuration of a camera system according to this embodiment is the same as that of the camera system according to the first embodiment. This embodiment is different from the first embodiment in cooperative driving control. This embodiment will discuss only a configuration different from that of the first embodiment and will omit a description of the common configuration.

Figure 9:
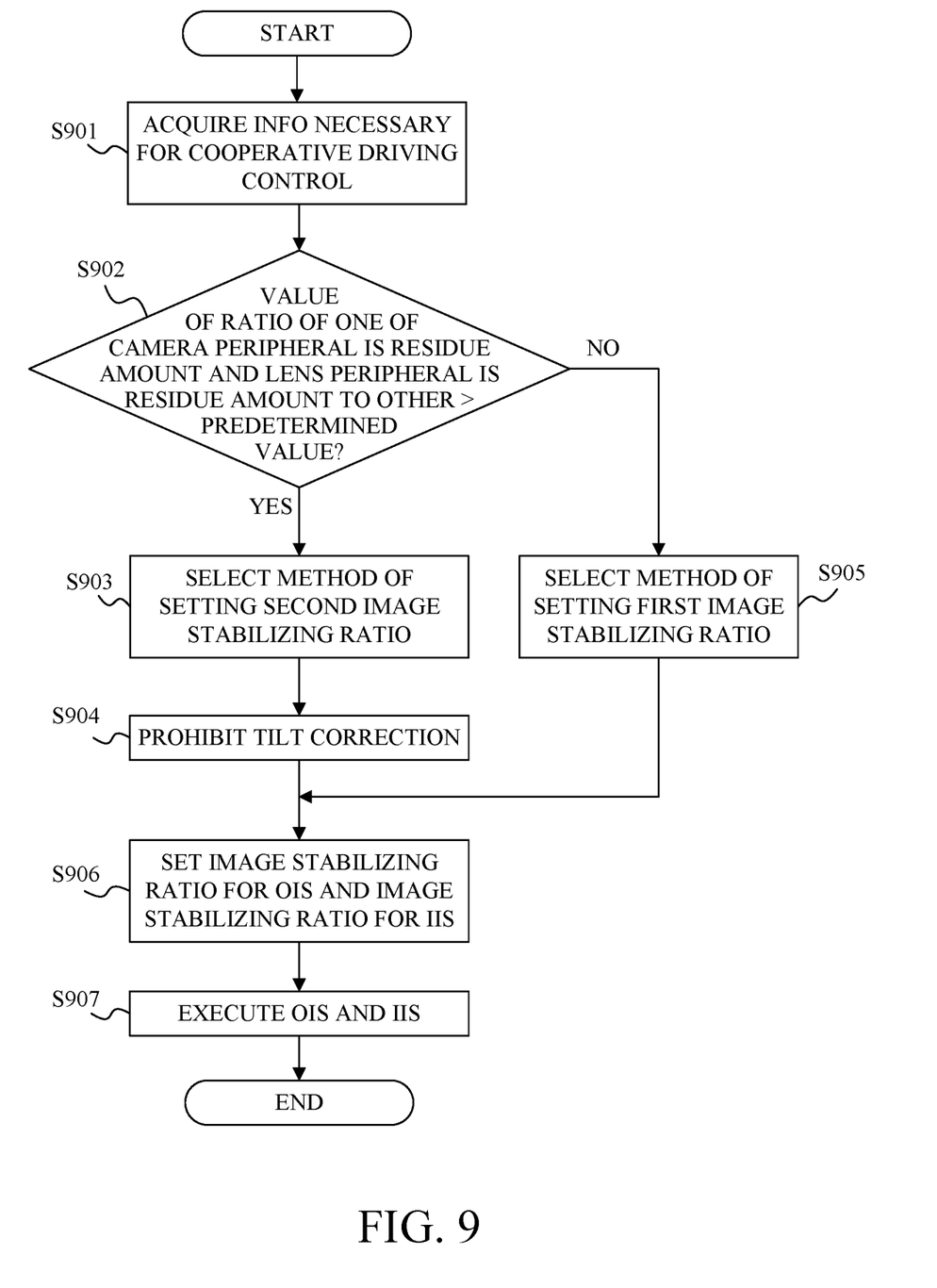
FIG. 9 is a flowchart illustrating cooperative driving control of OIS and IIS in a second embodiment.

Referring now to FIG. 9, a description will be given of the cooperative driving control of OIS and IIS according to this embodiment. This embodiment assumes that the lens MPU 110 executes the cooperative driving control. FIG. 9 is a flowchart illustrating the cooperative driving control of OIS and IIS according to this embodiment. After the camera system is powered on and the initial driving operation and the like are performed, this flow is started.

In step S901, the lens MPU 110 acquires information necessary for the cooperative driving control. The information necessary for the cooperative driving control includes the movable strokes of the OIS and IIS correction members, a camera peripheral image blur residue amount, a lens peripheral image blur residue amount, information on the sensitivity required for image stabilization, information on whether to perform electronic image stabilization by the image transformation processing unit 217, and the like.

In step S902, the lens MPU 110 determines whether a ratio of one of the camera peripheral image blur residue amount and the lens peripheral image blur residue amount to the other is larger than a predetermined value. In a case where it is determined that the ratio of one of the camera peripheral image blur residue amount and the lens peripheral image blur residue amount to the other is larger than the predetermined value, that is, the execution of image stabilization based on the first image stabilizing ratio is selected, the process of step S903 is executed. In a case where it is determined that the ratio of one of the camera peripheral image blur residue amount and the lens peripheral image blur residue amount to the other is smaller than a predetermined value, that is, the execution of image stabilization based on the second image stabilizing ratio is selected, the process of step S905 is executed. In a case where the ratio of one of the camera peripheral image blur residue amount and the lens peripheral image blur residue amount to the other is equal to the predetermined value, which step is executed may be arbitrarily set.

In step S903, the lens MPU 110 selects the method of setting the second image stabilizing ratio for reducing the image blur residue amount in the peripheral portion of the image.

In step S904, the lens MPU 110 sets to prohibit tilt correction in the electronic image stabilization. Thereby, only translational and rotational transformations can be performed in the electronic image stabilization.

In step S905, the lens MPU 110 selects the method of setting the first image stabilizing ratio based on the stroke ratio.

In step S906, the lens MPU 110 sets the image stabilizing ratio for OIS and the image stabilizing ratio for IIS using the selected image stabilizing ratio setting method.

In step S907, the lens MPU 110 executes OIS and IIS using the image stabilizing ratio calculated in step S805.

In a case where the ratio of one of the camera peripheral image blur residue amount and the lens peripheral image blur residue amount to the other is larger than the predetermined value, the configuration according to this embodiment selects the method of setting the second image stabilizing ratio for suppressing the image blur residue amount in the periphery portion of the image. Therefore, the image blur residue amount in the peripheral portion of the image can be reduced. In this case, a high image stabilizing effect can be obtained by prohibiting the tilt correction in the electronic image stabilization.

The cooperative driving control is performed by the lens MPU 110 in this embodiment, but may be performed by the camera MPU 102. In this case, the camera MPU 102 includes an acquiring unit, a determining unit, and a setting unit.

Each embodiment can provide a control apparatus that can provide a good image stabilizing effect.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-145477, filed on Sep. 13, 2022, which is hereby incorporated by reference herein in its entirety.

What is claimed is:

1. A control apparatus for use in a camera system that includes a first correction member provided on one of an image pickup apparatus and a lens apparatus attachable to and detachable from the image pickup apparatus, and a second correction member provided on the other of the image pickup apparatus and the lens apparatus, the control apparatus comprising:
 a memory storing instructions; and
 a processor configured to execute the instructions to control image stabilization using first control configured to provide image stabilization based on a first correction ratio between image stabilization using the first correction member and image stabilization using the second correction member and to electronically correct a trapezoidal distortion in an image blur, or second control configured to provide image stabilization based on a second correction ratio between image stabilization using the first correction member and image stabilization using the second correction member without electronically correcting the trapezoidal distortion in an image blur.

2. The control apparatus according to claim 1, wherein the second correction ratio is different from the first correction ratio.

3. The control apparatus according to claim 1, wherein the first correction ratio and the second correction ratio are set based on different information.

4. The control apparatus according to claim 1, wherein the first correction ratio is based on a movable amount of the first correction member and a movable amount of the second correction member, and the second correction ratio is based on information about an image moving amount between a central portion and a peripheral portion of an image in a case where the image stabilization using the first correction member is performed, and information about an image moving amount between the central portion and the peripheral portion in a case where the image stabilization using the second correction member is performed.

5. The control apparatus according to claim 1, wherein the processor is configured to execute:
 the first control in a case where correction of the trapezoidal distortion is selected, and
 the second control in a case where the correction of the trapezoidal distortion is not selected.

6. The control apparatus according to claim 1, wherein the processor is configured to execute:
 the first control in a case where the image stabilization based on the first correction ratio is selected, and
 the second control in a case where the image stabilization based on the second correction ratio is selected.

7. The control apparatus according to claim 1, wherein an image blur residual amount in the peripheral portion after the image stabilization based on the first correction ratio is performed is larger than an image blur residual amount in the peripheral portion after the image stabilization based on the second correction ratio is performed.

8. A lens apparatus comprising:
 the control apparatus according to claim 1; and
 an imaging optical system.

9. An image pickup apparatus comprising:
 the control apparatus according to claim 1; and
 an image sensor.

10. A camera system comprising:
 the control apparatus according to claim 1;
 an imaging optical system; and
 an image sensor.

11. A control method for use in a camera system that includes a first correction member provided on one of an image pickup apparatus and a lens apparatus attachable to and detachable from the image pickup apparatus, and a second correction member provided on the other of the image pickup apparatus and the lens apparatus, the control method comprising:
 controlling image stabilization using first control configured to provide image stabilization based on a first correction ratio between image stabilization using the first correction member and image stabilization using the second correction member and to electronically correct a trapezoidal distortion in an image blur, or second control configured to provide image stabilization based on a second correction ratio between image stabilization using the first correction member and image stabilization using the second correction member without electronically correcting the trapezoidal distortion in an image blur.

12. A non-transitory computer-readable storage medium storing a program that causes a computer of the image pickup apparatus or lens apparatus to execute the control method according to claim 11.

* * * * *